(12) United States Patent
Przybylski

(10) Patent No.: US 8,738,225 B2
(45) Date of Patent: May 27, 2014

(54) SYSTEM AND METHOD FOR AUTOMATICALLY MANAGING CURRENT DRAW FROM A TELEMATICS DEVICE IN TRANSIT

(75) Inventor: Matthew G. Przybylski, Gand Blanc, MI (US)

(73) Assignee: General Motors LLC, Detroit, MI (US)

( * ) Notice: Subject to any disclaimer, the term of this patent is extended or adjusted under 35 U.S.C. 154(b) by 399 days.

(21) Appl. No.: 13/016,400

(22) Filed: Jan. 28, 2011

(65) Prior Publication Data

US 2012/0193981 A1    Aug. 2, 2012

(51) Int. Cl.
*G06F 7/00* (2006.01)
(52) U.S. Cl.
USPC ........................................... 701/36; 307/79.1
(58) Field of Classification Search
USPC ........................................................... 701/36
See application file for complete search history.

(56) References Cited

U.S. PATENT DOCUMENTS

2009/0037044 A1*  2/2009  Enomoto et al. ................. 701/33
2009/0088910 A1*  4/2009  Yi et al. ............................ 701/1

* cited by examiner

*Primary Examiner* — Maceeh Anwari
(74) *Attorney, Agent, or Firm* — Leydig, Voit & Mayer, Ltd.

(57) ABSTRACT

The described method and system provide for reduction of the current draw from a vehicle battery caused by a telematics unit while the vehicle is in transit. By programming the telematics unit with instructions to ignore the awake algorithm or awake parameters while the vehicle is being shipped, or by programming the telematics unit to apply a different set of load-saving awake parameters while the vehicle is being shipped, the current draw from the vehicle battery caused by the telematics unit during shipping can be reduced. The telematics unit may implement a typical awake algorithm or awake parameters (e.g., non-load-saving parameters) after the occurrence of a predetermined trigger, such as the telematics unit determining that the vehicle has reached a destination area.

16 Claims, 4 Drawing Sheets

SYSTEM AND METHOD FOR AUTOMATICALLY MANAGING CURRENT DRAW FROM A TELEMATICS DEVICE IN TRANSIT

BACKGROUND OF THE INVENTION

Telematics units within mobile vehicles provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit can be utilized to provide a subscriber with the telematics services.

Telematics units generally remain powered on in some capacity and connected to a network even when the vehicle is off, i.e., when the vehicle is not running and the key is removed or turned to an off position. "Awake parameters" may be programmed into a telematics unit and may then be used by an "awake" algorithm that determines how the telematics unit will behave while the vehicle is in the off state. For example, awake parameters may allow the telematics unit to perform certain functions, such as sending and receiving information, while the vehicle is off.

However, after a telematics-equipped vehicle is manufactured and when it is in transit (i.e. being shipped), the telematics unit may not be required to be awake while the vehicle is off. Having the telematics unit remain awake in such circumstances may result in a parasitic load on the vehicle battery, causing the battery to be unnecessarily drained during shipping. In addition to simply wasting the battery charge, this inadvertent discharge may harm the battery and increase warranty expenses.

Thus, it is an object in part to provide a system and method for reducing the parasitic load on a battery caused by the telematics unit while the vehicle is off and is being shipped. However, while this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and method for reducing the current draw from a vehicle battery caused by a telematics unit while in transit. In one implementation, a telematics unit may be programmed during the vehicle manufacturing process to ignore an awake algorithm or any awake parameters until the device determines that it is within a pre-defined area, defined as the "destination," such as an area associated with a particular location, a dealership, or an owner of the vehicle. The area may be defined using a GPS (Global Positioning System) coordinate grid, and a vehicle manufacturing plant may program a set of GPS coordinates into the telematics unit through a plant programming system as the destination area. The telematics unit may then check the location of the vehicle to determine whether the vehicle is within the destination area, and, if the vehicle is within the destination area, the telematics unit may turn on the awake algorithm or apply the awake parameters within the awake algorithm.

In one implementation, the telematics unit may check the location of the vehicle periodically or from time to time until the vehicle reaches the destination. In an alternative implementation, the telematics unit may check the location of the vehicle only when the vehicle is turned on. In further alternative implementations, a different trigger may be set to turn on the awake algorithm or apply the awake parameter, such as receiving a command from a user, a dealership, or a TSP call center through buttons, dealership tools, or over a network, respectively In yet another further implementation, the awake parameters or awake algorithm may be programmed or applied over a network by the TSP call center while the vehicle is at the dealership or located with the owner. The dealership or the owner may send a request to have the awake parameters or awake algorithm programmed or applied by pressing a button or otherwise sending a request to the TSP call center. In yet another further implementation, the awake parameters or awake algorithm may be programmed by the dealership using dealership tools.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for reducing the current draw from a vehicle battery caused by a telematics unit while the vehicle is off and is being transported not under its own power. An awake algorithm governs how a telematics unit will behave while the vehicle is in the off state. Awake parameters are parameters used by the awake algorithm. The awake algorithm or awake parameters may be programmed into the telematics unit during manufacture at a manufacturing plant, over a network by the TSP, at a dealership using dealership tools (i.e. utilities available to dealerships allowing the dealership to program the telematics units of vehicles and perform other functions), and other suitable methods for programming the telematics unit.

In order to reduce current draw while the vehicle is being shipped, a telematics unit may be programmed to ignore an awake algorithm until a trigger occurs that tells the telematics unit to stop ignoring and to apply the awake algorithm. Alternatively, a telematics unit may be programmed such that an awake algorithm ignores typical awake parameters or applies a different set of load-saving awake parameters until a trigger occurs telling the telematics unit to apply the typical awake parameters. In yet another alternative, the telematics unit may be programmed without any awake algorithm or awake parameters until after the vehicle is shipped.

After a vehicle is manufactured, the vehicle is generally shipped to a destination where it will be sold to an owner or may be shipped directly to an owner. During shipping, the vehicle generally remains off, and the telematics unit may draw current from the vehicle battery according to the set of load-saving awake parameters or may draw no current, depending on how the telematics unit is programmed.

While various awake and load-saving parameters and algorithms may be used, in an implementation, the awake algorithm applying typical awake parameters will cause the telematics unit to remain in a communication mode ready to receive wireless communications, and to register its presence when new zones and/or carriers are encountered. Load-saving behavior, in contrast, would cause the telematics unit to not register upon entry to new zones and/or carrier territories, and to not remain in a ready state to receive wireless communications.

Figure 1:
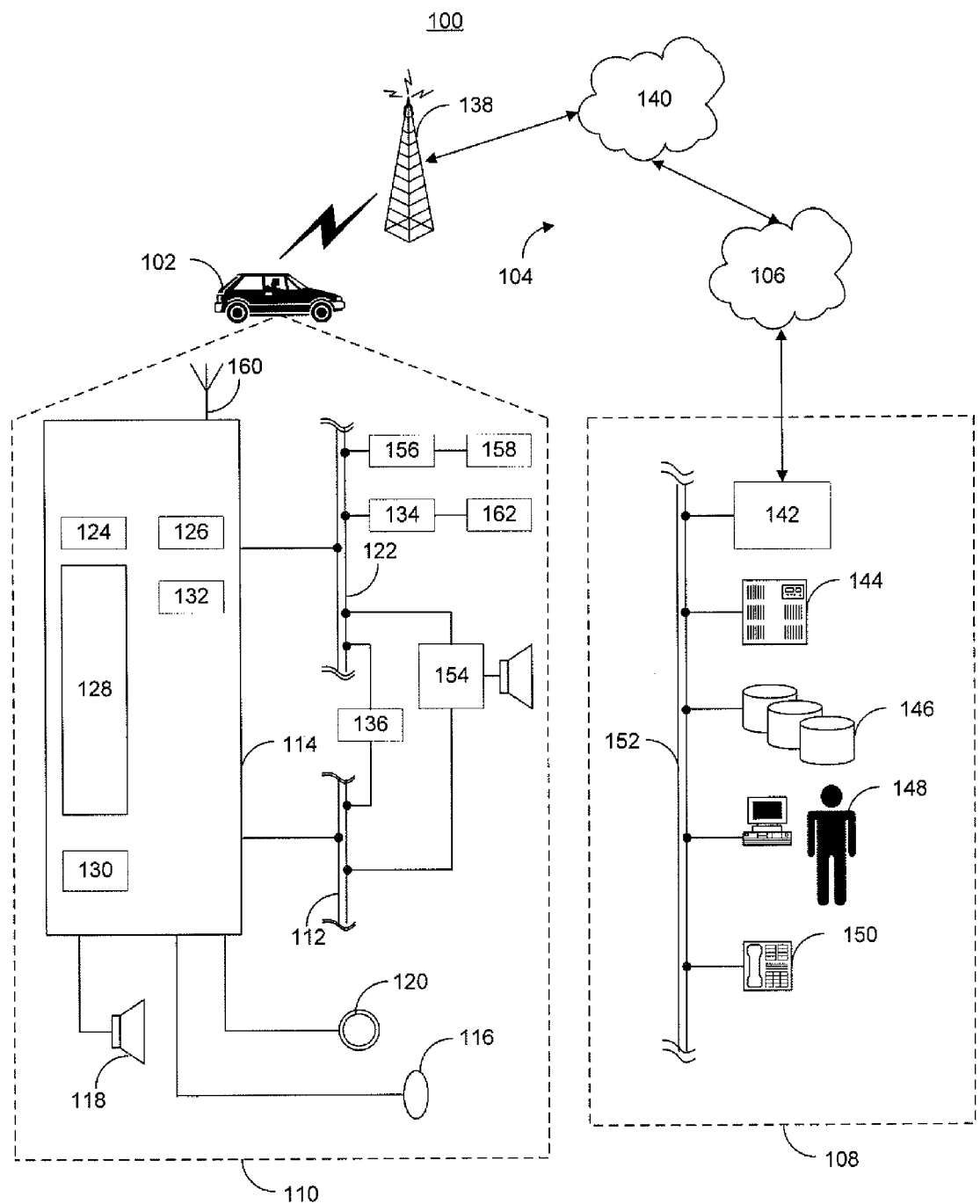
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122.

Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 144.

As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

With further reference to the architecture of FIG. 1, and turning more specifically to FIG. 2, a process 200 is depicted wherein the telematics unit of a telematics-equipped vehicle may be programmed to ignore an awake algorithm, to ignore awake parameters, or to apply a set of load-saving awake parameters during vehicle manufacture and subsequently shipped to a destination. In one implementation, while the vehicle is being manufactured, the telematics unit may be programmed 201 with a typical awake algorithm including typical awake parameters and with instructions to ignore the typical awake algorithm until a certain trigger occurs. In another implementation, while the vehicle is being manufactured, the telematics unit may be programmed 201 with a typical awake algorithm including typical awake parameters and may also be programmed with instructions to ignore the typical awake parameters until a certain trigger occurs. In yet another implementation, while the vehicle is being manufactured, the telematics unit may be programmed 201 with an awake algorithm including a first set of typical awake parameters, and with instructions to apply a second, load-saving set of awake parameters until a certain trigger occurs, after which the telematics unit may apply the first set of typical awake parameters.

The vehicle may then be shipped 203 towards a destination, such as the location of a dealership or owner, and while the vehicle is off, the telematics unit may draw current from the vehicle battery 205 at a reduced rate (relative to typical awake parameters when the vehicle is not in transit) or may not draw current from the vehicle battery at all. The reduction in draw is due to the application of the modified awake parameters or to the programmed behavior of ignoring the awake parameters until the trigger occurs.

The telematics unit may check whether a trigger 207 has been met, and if not, the telematics unit continues to draw current from the vehicle battery 205 at a reduced rate or not at all. If the trigger 207 has been met, the vehicle may cease ignoring the typical awake algorithm 209, stop ignoring the typical awake parameters 209, or apply the first set of typical awake parameters 209, depending on the implementation.

In one implementation, the trigger 207 may be the arrival of the vehicle within a geographic area defined as the destination, such as an area associated with a particular location, a dealership, or an owner of the vehicle. The geographic area may be a pre-defined GPS coordinate grid, and the telematics unit may utilize the GPS chipset/component 132 to determine the location of the vehicle and compare the location of the vehicle to the destination area. A set of GPS coordinates which defines the destination area may be known to the manufacturing plant and programmed into the telematics device during manufacture.

One skilled in the art will appreciate that the telematics unit may check the location of the vehicle during transit of the vehicle while the vehicle is off via one of a number of different mechanisms. For example, the telematics unit may remain awake with load-saving awake parameters and check the location of the vehicle periodically (at a regular interval or from time-to-time). Alternatively, the telematics unit may remain off and check the location of the vehicle when the vehicle is turned on. As another alternative, the telematics unit may receive a command to check the location of the vehicle through a button or other method of communicating with the telematics unit such as use of dealership tools or over a network. As yet another alternative, the telematics unit may be programmed with instructions to "wake up" and enter the awake state periodically to check the location of the vehicle and then turn itself off again.

In a further implementation, the trigger 207 may be a condition other than the arrival of the vehicle within the destination area. For example, the trigger may be a request or command by a dealership or owner that the typical awake algorithm or typical awake parameters be implemented through a button or other method of communicating with the telematics unit such as dealership tools or communications over a network. In another example, the trigger may simply be the vehicle being powered on after the vehicle has left the manufacturing plant. One skilled in the art will appreciate that numerous different triggers can be used, and multiple triggers may be used simultaneously, such that the occurrence of any one of the multiple triggers will result in the telematics unit implementing the typical awake algorithm or typical awake parameters.

Figure 3:
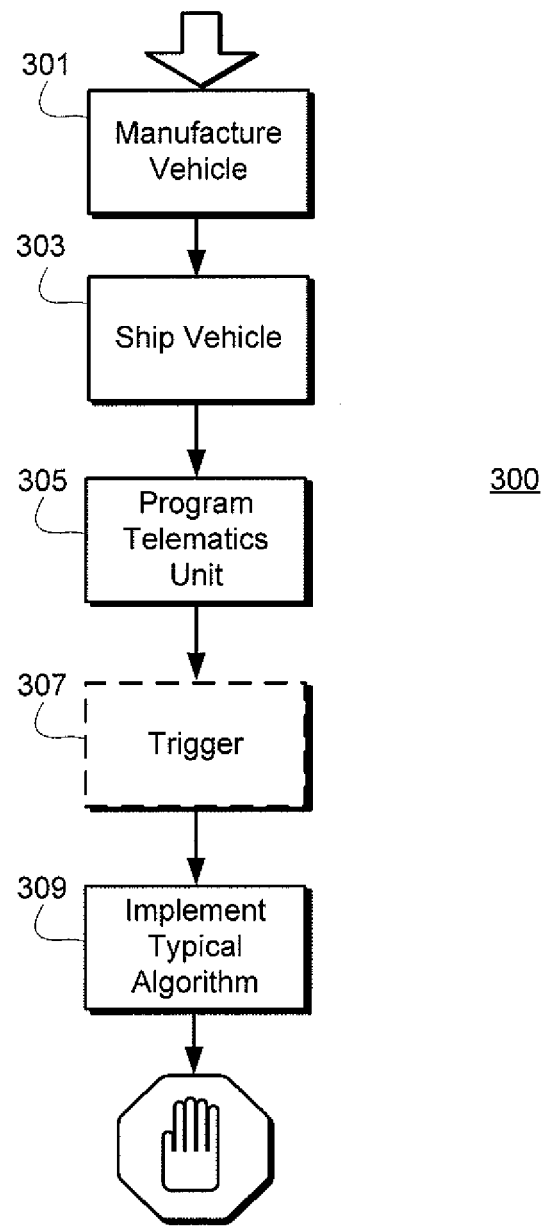
FIG. 3 is a flowchart illustrating a process for programming and implementing an awake algorithm in accordance with another implementation of the described principles.

With further reference to the architecture of FIG. 1, and turning more specifically now to FIG. 3, a process 300 is depicted wherein the telematics unit of a telematics-equipped vehicle may be programmed with an awake algorithm or awake parameters after the vehicle is manufactured and shipped to a destination. In one implementation, a telematics-equipped vehicle is manufactured 301 at a manufacturing plant and shipped to a destination 303 such as a dealership or an owner. The vehicle may be manufactured without an awake algorithm or awake parameters and thus the telematics unit may remain off while the vehicle is off during shipping, resulting in no current being drawn from the vehicle battery by the telematics unit. After arriving at the destination, the vehicle may be subsequently programmed 305 with an awake algorithm or awake parameters by a dealership using dealership tools or by a TSP call center over a network upon request by a dealership or by an owner. Because the vehicle has already been shipped, the telematics unit may be directly programmed with a typical awake algorithm or typical awake parameters, without instructions to ignore the awake algorithm or awake parameters until the occurrence of a trigger or without a set of load-saving awake parameters. Thus, the typical awake algorithm or typical awake parameters may be directly implemented 309.

Figure 2:
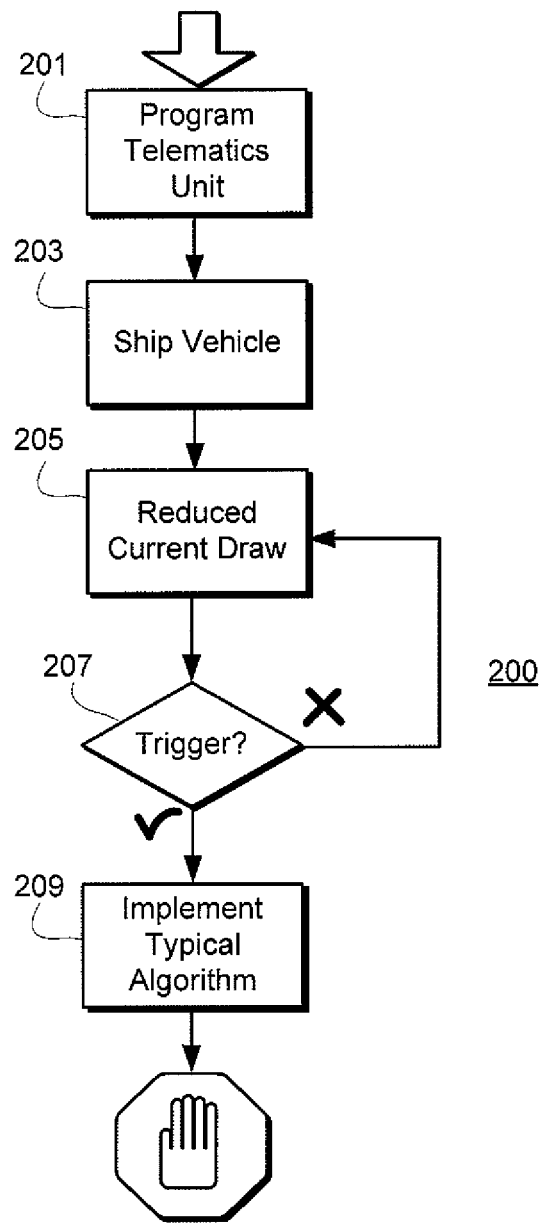
FIG. 2 is a flowchart illustrating a process for programming and implementing an awake algorithm in accordance with an implementation of the described principles.

However, in some implementations, such as where the vehicle will be shipped again, it may be advantageous to program the telematics unit with additional instructions to ignore the awake algorithm or awake parameters until the occurrence of a trigger 307 or to program the telematics unit with a second set of load-saving awake parameters, as described above with reference to the process 200 relating to FIG. 2. In these implementations, the typical awake algorithm or typical awake parameters may not be implemented 309 until a trigger 307 first occurs.

Figure 4:
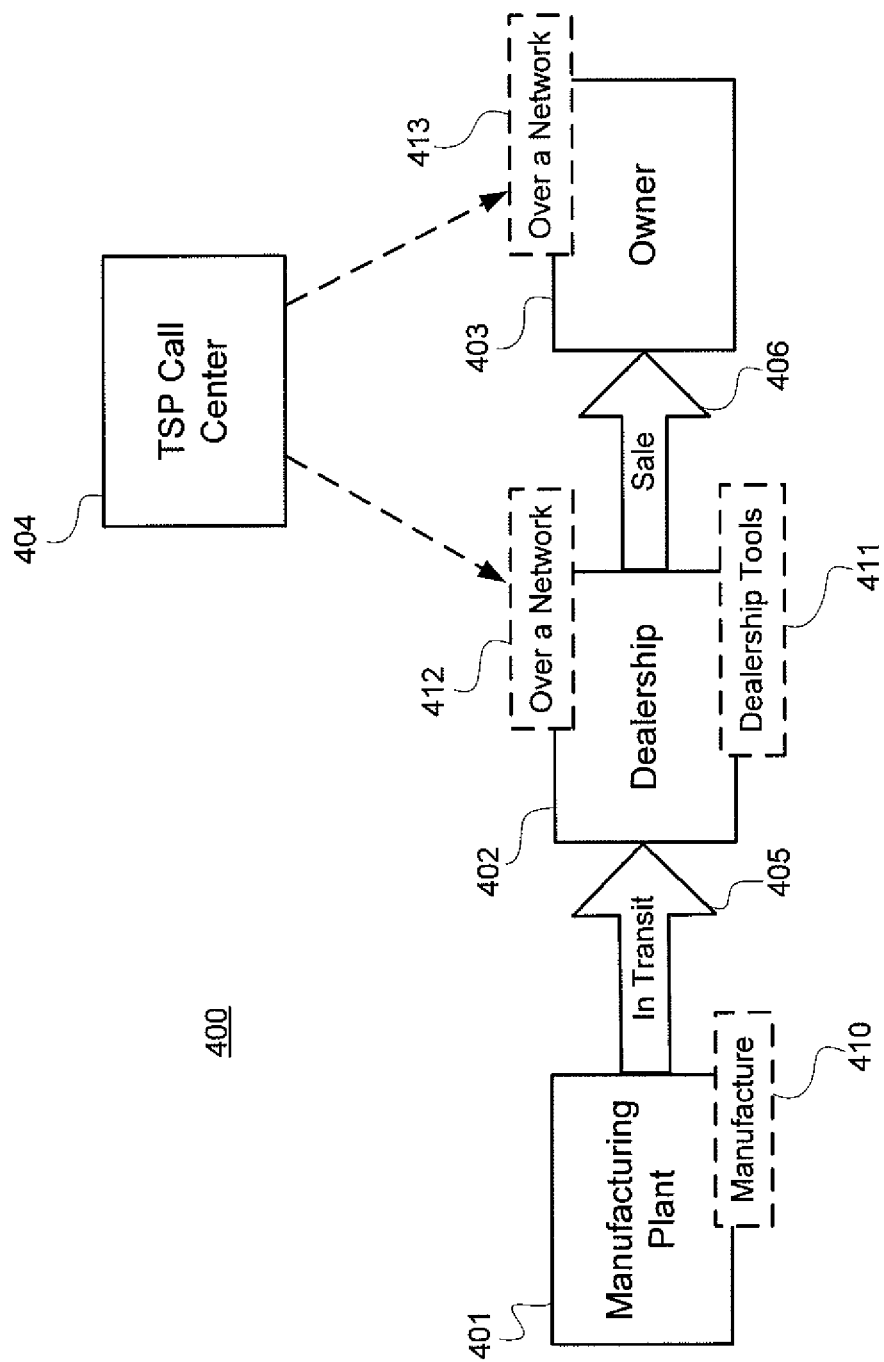
FIG. 4 is a flowchart illustrating options for programming a telematics unit in accordance with alternative implementations of the described principles.

With further reference to the architecture of FIG. 1 and the processes of FIGS. 2 and 3, a flowchart 400 is depicted in FIG. 4 illustrating the manner and timing with which the telematics unit may be programmed with an awake algorithm or awake parameters in various implementations. A telematics-equipped vehicle may be manufactured at manufacturing plant 401 and shipped 405 to a dealership 402. The dealership may then sell 406 the vehicle to an owner 403.

A TSP call center 404 may communicate with the telematics unit on the vehicle over a network. In one implementation, a typical awake algorithm or typical awake parameters may be programmed into the telematics unit at the manufacturing plant 410, along with instructions to ignore the typical awake algorithm or typical awake parameters or along with a second set of load-saving awake parameters as described above with regard to the process 200 of FIG. 2.

In another implementation, an awake algorithm or awake parameters may instead be programmed into the telematics unit at the dealership using dealership tools 411. In yet another implementation, an awake algorithm or awake parameters may be programmed into the telematics unit by the TSP call center over a network while the vehicle is at the dealership 412 or while the vehicle is with the owner 413.

It will be appreciated by those of skill in the art that the execution of the various machine-implemented processes and steps described herein occurs via the computerized execution of computer-executable instructions stored on a tangible non-transient computer-readable medium, e.g., RAM, ROM, PROM, volatile, nonvolatile, or other electronic memory mechanism. Thus, for example, the instructions programmed into the telematics unit relating to an awake algorithm or awake parameters may be stored on a tangible, non-transient computer-readable medium and may be executed by an application installed in the telematics unit.

It will be appreciated that the described system and method allows for reduction of the current draw from a vehicle battery caused by a telematics unit while the vehicle is in transit. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for reducing energy drawn from a vehicle battery, the method comprising:
configuring a non-transient computer readable medium at a telematics unit to cause the telematics unit to operate in a reduced energy consumption mode until the occurrence of a predetermined trigger and to operate in a higher energy consumption mode after occurrence of the trigger by adhering to computer executable instructions to ignore, while the vehicle is off and until the occurrence of the predetermined trigger, at least one of the group consisting of: an awake algorithm and awake parameters;

shipping the vehicle towards a predetermined destination; and repeatedly checking, by the telematics unit, the location of the vehicle during the shipping;

wherein the predetermined trigger is the telematics unit determining that the vehicle has entered a predetermined geographic space.

2. The method of claim 1, wherein the non-transient computer readable medium at the telematics unit is configured at a manufacturing plant where the vehicle is manufactured.

3. The method of claim 2, wherein the predetermined trigger is at least one of: the vehicle arriving at a predetermined geographic space; the telematics unit receiving a command to stop ignoring at least one of the awake algorithm and the awake parameters; and the vehicle being turned on.

4. The method of claim 1, wherein the predetermined geographic space is defined by a set of GPS (Global Positioning System) coordinates.

5. The method of claim 4, wherein the set of GPS coordinates is programmed into the telematics unit at the manufacturing plant where the vehicle is manufactured.

6. The method of claim 5, wherein the telematics unit checks the location of the vehicle when the vehicle is turned on.

7. The method of claim 1, wherein the non-transient computer readable medium at the telematics unit is configured at a dealership using dealership tools.

8. The method of claim 1, wherein the non-transient computer readable medium at the telematics unit is configured by a call center over a network.

9. A method for reducing energy drawn from a vehicle battery, the method comprising:

configuring a non-transient computer readable medium at a telematics unit with an awake algorithm, a first set of awake parameters, and a second set of awake parameters, wherein application of the second set of awake parameters to the telematics unit causes the telematics unit to operate in a reduced energy consumption mode while the vehicle is off and the application of the first set of awake parameters to the telematics unit causes the telematics unit to operate in a higher energy consumption mode while the vehicle is off;

implementing, at the telematics unit, the second set of awake parameters until the occurrence of a predetermined trigger;

shipping the vehicle towards a predetermined destination;

repeatedly checking, by the telematics unit, the location of the vehicle during the shipping; and implementing, at the telematics unit, the first set of awake parameters after the occurrence of the predetermined trigger, wherein the predetermined trigger is the telematics unit determining that the vehicle has entered a predetermined geographic space.

10. The method of claim 9, wherein the non-transient computer readable medium at the telematics unit is configured at a manufacturing plant where the vehicle is manufactured.

11. The method of claim 9, wherein the predetermined geographic space is defined by a set of GPS (Global Positioning System) coordinates.

12. The method of claim 11, wherein the set of GPS coordinates is programmed into the telematics unit at the manufacturing plant where the vehicle is manufactured.

13. The method of claim 9, wherein the non-transient computer readable medium at the telematics unit is formatted at a dealership using dealership tools.

14. The method of claim 9, wherein the non-transient computer readable medium at the telematics unit is formatted by a call center over a network.

15. A non-transient computer readable medium having thereon computer executable instructions for reducing energy drawn from a vehicle battery, the computer executable instructions comprising:

instructions for operating a telematics unit in a reduced energy consumption mode by applying a load-saving set of awake parameters to an awake algorithm initially and until the occurrence of a predetermined trigger;

instructions for operating a telematics unit in a higher energy consumption mode by applying a non-load-saving set of awake parameters to the awake algorithm after the occurrence of the predetermined trigger; and instructions for repeatedly checking, by the telematics unit, the location of the vehicle during shipping of the vehicle to a predetermined destination and comparing the location of the vehicle with a predetermined geographic space;

wherein the predetermined trigger is determining that the location of the vehicle is within the predetermined geographic space.

16. The computer readable medium according to claim 15, wherein the predetermined geographic space is defined by a set of GPS (Global Positioning System) coordinates.

* * * * *